Figure 1:
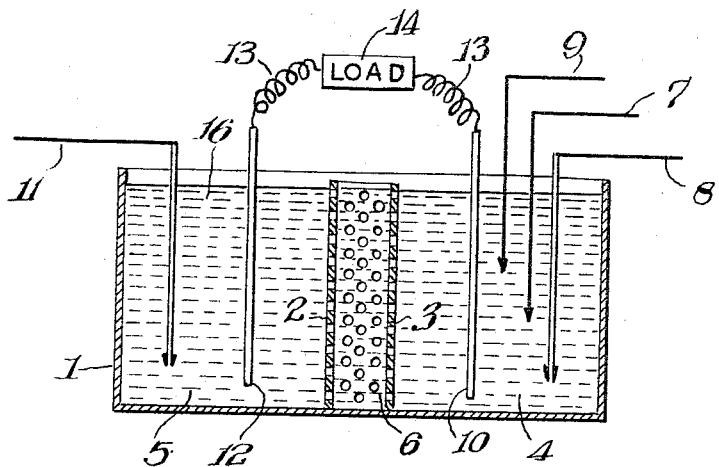

July 18, 1967 J. B. DAVIS ETAL 3,331,705
BIOCHEMICAL FUEL CELL
Filed July 11, 1962

Inventors
John B. Davis &
Henry F. Yarbrough
By Oswald G. Hayes
Attorney

United States Patent Office 3,331,705
Patented July 18, 1967

3,331,705
BIOCHEMICAL FUEL CELL
John B. Davis and Henry F. Yarbrough, Dallas, Tex., assignors to Mobil Oil Corporation, a corporation of New York
Filed July 11, 1962, Ser. No. 209,088
17 Claims. (Cl. 136—86)

This invention relates to biochemical fuel cells and, more particularly, it relates to fuel cells in which hydrocarbons are used indirectly as an energy source. Still more particularly, it relates to the generation of electrical power by the use of micro-organisms or enzymes and a fuel, as, for example, a compound which contains carbon, hydrogen and oxygen, such as products obtained from the oxidation of hydrocarbons, the production of current being assisted by the use of an electron mediator.

It is well known that biological reduction-oxidation reactions are a source of electrical energy. However, this source has not been exploited for a number of reasons. One of the reasons is that the known metabolic processes, while creating a potential, are unable to sustain it and only negligible power has been produced.

Thus, an objective of this invention is the provision of a method for sustaining the electrical output of microbial fuel cells. Another purpose is supplying fuels and reactions which afford the spontaneous production of electrical energy. A still further aim is to utilize biological-biochemical processes to produce electrical energy. Another object is to prepare oxygenated fuels by the use of microbes and to continue the oxidation of these fuels by the use of micro-organisms in such a manner to produce electrical power. Another purpose is to make fuel cells operable by microbial cell action when such fuel cells would not otherwise be operable under electrochemical conditions. Another aim is to increase the hydroxyl ion driving force gradient. These and other objects will appear hereinafter.

The purposes of this invention are accomplished, for example, by charging a half-cell of a fuel cell with a fuel containing carbon, hydrogen and oxygen, such as a product of microbial oxidation of a hydrocarbon and injecting a microbial culture capable of oxidizing the fuel. The culture may be one grown on a hydrocarbon or it may be some other culture. In any event, the half-cell is kept under anaerobic conditions in the presence of an anode. In another step a second half-cell is simultaneously charged with an oxidizing environment in the presence of a cathode while separating the two half-cells by a semipermeable membrane to maintain the said anaerobic and aerobic conditions and to permit the flow of hydroxyl or oxide ions, the said anode and cathode being connected by an electrical conductor through a load receiving element. Thus, the process of this invention produces useful electric power from metabolic processes of microbes. These organisms convert or oxidize hydrocarbons, and in turn the cells themselves and the chemicals therein become fuel. Instead of microorganisms, enzymes may be used in the biological half-cell. The microbe or enzyme may be an aerobe or an anaerobe. In copending applications the utilization of extracellular material and the utilization of intracellular products are described and claimed, the copending applications being Serial No. 209,086 filed on July 11, 1962, and Serial No. 209,087 filed on July 11, 1962, respectively. In the process of the present invention as in the others, with the oxidation or chemical conversion of the oxygenated material at an anode, electrons are released to an external circuit, which generally has a load-bearing unit in it, and these electrons at the cathode, which is bathed in oxygen, reduce oxygen to oxides. These in turn travel through an electrolyte to the anode to complete the circuit. To increase the flow of the hydroxyl ions the processes are effected in the presence of a hydrogen acceptor which may be added separately or may be contained in the cells of a microorganism. Thus, in this invention, an electron mediator is present, such as a hydrogen acceptor, and this is used to sustain or augment the current.

This invention will be further understood by reference to the examples and figures which are given for illustrative purposes only and are not limitative.

Figure 2:
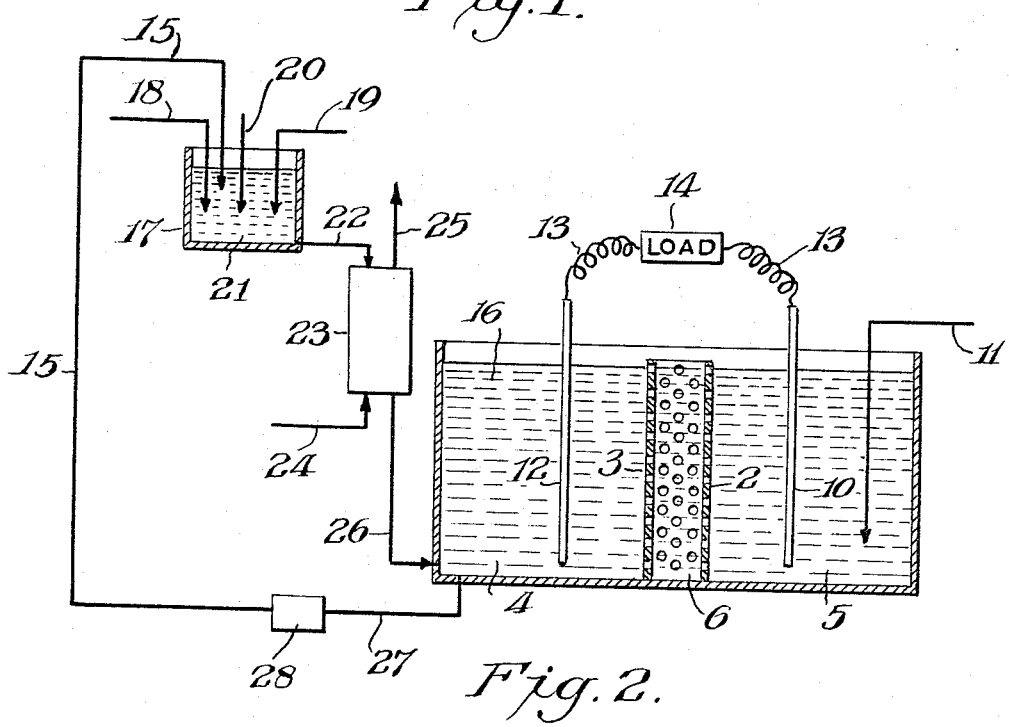

FIGURE 1 is a line diagram showing the relationship of the half-cells, the membrane, the electrodes and the load; and FIGURE 2 is a similar diagrammatical view showing a means of preparing a microbial culture fuel cell mixture separately and adding the mixture to the cell.

From FIGURE 1 it will be seen that a vessel 1 is divided by membranes 2 and 3 into three compartments: the half-cell 4, the half-cell 5, and the separator cell 6. The half-cell 4 is the anaerobic cell; it has reactors or a feed line 7 for reactors in it, a feed line 8 for food or substrates for the reactors, if such separate feed is desired, a feed line 9 for a hydrogen acceptor or other additives if such others are being used and an anode 10. The half-cell 5 has in it a feed line 11 for oxygen and nearby a cathode 12. The cathode and the anode are connected through wire 13 to a load bearing device 14. The liquid material 16 may be, for example, a salt solution such as, for example, a 1% to 3% aqueous solution of sodium chloride buffered to a pH of 7 with disodium acid phosphate and potassium dihydrogen phosphate. In many instances no inlets at all are used, the materials being transferred in bulk. It will also be appreciated that the biological-biochemical half-cell, as can the other, may be equipped with means to remove spent or undesired material, such as a drainage valve or recycling means line 27, pump 28 and feed line 15.

Using equipment and substantially neutral, non-toxic conductive solutions as those described above, the biological-biochemical process, which may be a metabolic process in which extra-cellular or intracellular fuel is consumed by microbes or in which an enzymatic process occurs, creates a half-cell potential in the presence of at least one anode in the biological half-cell relative to the potential in the cathodic half-cell. For the latter, generally oxygen is made to contact an electrode. The resultant aerobic cathode is kept separated from the anaerobic anode by the presence of a permeable membrane and preferably by two such membranes located fairly near each other and separating the vessel into three compartments, these being the cathodic half-cell, the walled section and the anodic half-cell. Into the walled section 6, both membranes creating it being permeable, is bubbled oxygen-free nitrogen. Thus, the aerobic and anaerobic cells are effectively separated and no oxygen permeates into the anaerobic half-cell. Any nitrogen permeating into the cathode is very small in amount and is harmless. For completion of the electrical circuit a wire 13 connects the anode 10 and cathode 12 and the electric current is made to do work at load 14.

As an example, a certain extra-cellular material being metabolized by bacteria is converted to hydrogen ions and electrons, as by such changes as the following in which taken as an example is $C_4H_8O_3$, beta-hydroxybutyric acid, an extra-cellular product utilized in this invention:

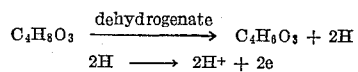

or

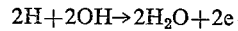

this occurring in the anodic cell. Dehydrogenation is the first step. The electrons pass via the wire to the other half-cell leaving the biological-biochemical half-cell with a positive potential. To this anodic half-cell are attracted hydroxyl ions which are being formed at the electrode bathed by oxygen.

$$2e + \tfrac{1}{2}O_2 + H_2O \rightarrow 2OH^-$$

and the electric circuit is complete. The hydroxyl ions migrating from the non-biological or non-biochemical half-cell leave the electrode there with a positive charge so that the metallic electrode becomes positive to attract more electrons from the said half-cell. The hydroxyl ions migrate to the anode through the surrounding electrolyte. This migration is effectively hastened by the presence of the hydrogen acceptor which receives hydrogen from the organic substrate, the fuel, via the enzyme or microbial intracellular enzymes. The hydrogen acceptor releases electrons to the anode with the formation of hydrogen ions as noted above.

The electrolyte can be a solution of a wide variety of salts or mixtures of salts. If microbes are being used, most frequently the electrolyte will be a culture medium in which the microbes grow well. For example, the electrolyte can be a simple solution of one salt, sodium chloride, for example, or it may be a mixture of sodium, potassium and ammonium salts such as the nitrates, phosphates, sulfates and the acid salts of those. Usually, the pH is kept between about 6.0 to about 8.0, a pH of 7.0 being preferred. Nitrogen may be supplied in the form of urea or asparagine or similar organic forms providing neutrality and these are preferred to the nitrates.

The fuel cells of this invention can be used in series or in parallel, if desired, to provide additional current.

In FIGURE 2 is shown a modified form of apparatus used in this invention in the microbial processes. Vessel 17 is an oxidator equipped with an inlet 18 for microbial cultures and inlet 19 and 20 for air or oxygen, hydrocarbons and other materials as desired, such as nutrients. Thus, a medium 21 containing micro-organisms that are growing on hydrocarbons is formed. After substantial growth is obtained the medium 21 may be piped through inlet 22 into exchanger 23 in which the air or oxygen in medium 2 is replaced by nitrogen or some non-oxidative gas coming into container 23 via inlet 24. The air or oxygen admixed with nitrogen is flushed out exit 25. The resultant oxygen-free medium is then passed through pipe 26 into half-cell 4 for anaerobic respiration used in the production of the electric current. Recycling is effected by means comprising line 27 and 15 and pump 28 as described above. Similarly, the electron mediator, such as a hydrogen acceptor may be rejuvenated or oxidized in vessel 17 initially or in a cycle or continuous process.

The invention will be further understood by reference to the examples given below. These are illustrative only and are not to be taken as limitative.

EXAMPLE I

Into an oxidator 17 was placed 3 mg. of *Nocardia salmonicolor*, strain No. 107–332, being fed through 18 along with a culture medium made up of the following materials in the amounts indicated (g./l. of water): urea (1.0), disodium acid phosphate (0.3), potassium dihydrogen phosphate (0.2), magnesium sulfate septahydrate (0.2) and ferrous sulfate septahydrate (0.2). The oxidator is equipped with the inlets 19 and 20 for gaseous or other materials and through them fuel is fed to the Nocardia. This fuel is generally a hydrocarbon and preferably it is a gaseous hydrocarbon such as ethane, propane or n-butane or similar n-alkanes. It is fed admixed, usually about 10% to about 30%, with about 90% to about 70% of air.

The oxidator is equipped with an impeller and a sparger (not shown) to stir the reaction medium 21. The impeller is driven by a motor at high speeds and the mass is vigorously agitated. The sparger serves to feed the fuel into the mass. As a result a shearing action is imparted to the mass and to the cells and very large contact is made between the cells and the fuel. The equipment is further described in copending application Ser. No. 149,112, filed on Oct. 31, 1961, now abandoned and refiled on May 7, 1964 as Ser. No. 370,392.

In such equipment ethane is fed and rapid growth of the Nocardia results. The cells feed on the hydrocarbon and excellent yields of cells are obtained. The inexpensive hydrocarbon serves as food for getting substantial quantities of cells on hand for use in the fuel cell processes of this invention. The resultant microbial suspension is then fed through pipe 22 into a cell 23 through which nitrogen is passed by way of pipe 24 to remove oxygen, and then it is passed to the anaerobic half-cell 4 which contains the anode while the cathode in half-cell 5 is kept under aerobic conditions. Nitrogen is generally bubbled through the partition 6 formed by the permeable membranes 2 and 3. In the presence of fuel in the anodic half-cell which fuel is mainly in the form of extra-cellular fuel from microbial cells a current is generated and is made to act on load device 14. The electrical power was measured as 115 mv., the reading of the apparatus in the absence of the cells being 50 mv. Methylene blue was added as the electron mediator and this led to a constant EMF of 245 mv. Feeding of ethane to the anaerobic half-cell gave no increase in EMF.

This confirmed that nocardial cells could not metabolize ethane under anaerobic conditions even with methylene blue present. Thus, it appears that oxygen is required in the first step of the microbial oxidative metabolism of the hydrocarbon. Further, the desired effect might be accomplished by feeding an extra-cellular, oxygen-containing fuel.

Glucose was used as a typical compound of a fuel containing carbon, hydrogen and oxygen. It was added to the microbial culture in half-cell 4 along with stepwise additions of methylene blue. Upon addition of 0.5 mg. of the hydrogen acceptor the EMF became 265 mv. Successive additions, stepwise, of 1.5, 4 and 10 mg. of the acceptor brought the EMF to 295 and 305 and 300 mv. with milliamperes of 0.45 and 0.6 and 1.7, respectively, being produced. Upon addition of 35 mg. more of methylene blue, this being an excess, the current increased to 2 milliamperes.

Similar results were obtained when Mycobacteria were used in the anaerobic half-cell instead of the Nocardia, the oxygen containing fuel being glucose.

The methylene blue decolorizes as it is reduced in the anodic cell. It and the nocardial suspension can be cycled so that it periodically comes into contact with air and hydrocarbon and it is returned to the anaerobic half-cell. This oxidizes the hydrogen acceptor and it also rejuvenates the microbes. In an instance such as above when a hydrocarbon is being fed the cells grow in the cyclic period building up stored cellular products so that those products consumed in the half-cell in its production of current are replaced. Glucose can be added batchwise or continuously as desired.

The experiment is repeated with the exception that an extra-cellular fuel is not added. The cells which were fed on the hydrocarbon convert it into products stored within the cells. These products, depending on the hydrocarbons used, include triglycerides of palmitic, stearic and oleic acids, waxes such as cetyl palmitate and stearyl stearate from long chain alkanes as $C_{14}$, $C_{16}$, $C_{18}$ or $C_{20}$, and polymers such as poly(beta-hydroxybutyrate). Here, again, the process may be cyclic and the cells can be revitalized by letting them feed aerobically on hydrocarbons after which they are returned to the anaerobic half-cell where in the presence of a hydrogen acceptor, such as methylene blue, a current is generated which can be used to operate a load device 14, such as a transistorized circuit.

EXAMPLE II

To a fermentor was added 2 liters of aqueous nutrient containing the following salts (grams/liter given in parentheses): ammonium sulfate (1.0), potassium dihydrogen phosphate (0.25), disodium hydrogen phosphate (0.25), sodium carbonate (0.1), magnesium sulfate septahydrate (0.2), calcium chloride (0.01), ferrous sulfate septahydrate (0.005) and manganese sulfate (0.002) and to this was added 8 mg. of ashed yeast extract per liter to insure the presence of trace elements required for bacterial growth. To the resultant electrolyte was added 100 ml. of a culture of *Nocardia salmonicolor*, strain M.O., and ethyl benzene and a small amount of n-octadecane. Incubation at 30° C. and a pH of 7.0 with strong agitation were continued until good yields of microbial cells and phenylacetic acid were obtained, maintaining the neutrality by buffering with sodium phosphate. The acid resulted from the oxidation of the hydrocarbon by the aerobic oxidation action of the Nocardia.

The oxidation was continued anaerobically by placing the product comprising phenylacetic acid, isolated from microbial cells or with the cells, into the half-cell 4 of the apparatus shown in FIGURE 1. The half-cell 4 was charged with other Nocardia if no cells were being added with the oxygenated hydrocarbon.

With the cathode being bathed with oxygen and the circuitry as shown, in the presence of methyl viologen as the electron exchanger the metabolic action of the cells on the extracellular product, phenylacetic acid, resulted in the production of current as measured by an EMF of about 200 mv.

Following similar procedures as above and as described in copending application S.N. 850,015, filed Nov. 2, 1959 (U.S. Patent No. 3,057,784), n-butylcyclohexane was oxidized to cyclohexylacetic acid, n-propylbenzene to benzoic acid, n-nonylbenzene to benzoic acid using a Nocardia such as *Nocardia salmonicolor*, strain M.O. or strain No. 107–332 or *Nocardia corallina*. In each instance the further oxidation or dehydrogenation in the fuel cell produced current. In related experiments the extracellular acids, such as benzoic acid and phenylacetic acid, produced by hydrocarbon oxidizers are placed in fuel cells containing microorganisms which are not hydrocarbon oxidizers. These include *Escherichia coli*, *Bacterium acidipropionici*, the various Rhizobium, Clostridium and Azotobacter, among others. Thus, while frequently the organism oxidizing the hydrocarbon, if one is used, may be later used in the half-cell, it need not be.

EXAMPLE III

To test the applicability of the process described in Example II, the Nocardia culture was replaced by a culture of *Pseudomonas aeruginosa* in one set of experiments and by *Mycobacterium paraffinicum* in another. A variety of hydrocarbons was oxidized including p-cymene, methyl cyclohexane and n-dodecylbenzene using also as a food source ethane, butane or heptane to prevent complete oxidation of the cyclic hydrocarbon, stopping it at the cyclic acid stage. In each case the cyclic carboxylic acid was successfully further metabolized under fuel-cell conditions in the presence of a hydrogen acceptor, and an electric current resulted.

Again, *B. aliphaticium liquifaciens* is placed in the anaerobic cell and is fed the extracellular products produced by oxidizing methylcyclohexane with *Mycobacterium phlei*. Electric current is prduced. Similarly, *Pseudomonas putida* is used to oxidize n-butylbenzene with n-hexane present, and the extracellular products are fed to a cell containing *E. coli* in the anaerobic half-cell. This microorganism has its own built-in hydrogen acceptor and its use led to more sustained currents and higher currents than those obtained in its absence.

EXAMPLE IV

Under conditions similar to those described in Example II, ethane was oxidized to ethanol by *Pseudomonas methanica* in good yields. The product was transferred to a fuel-cell containing *Escherichia coli* which in the anaerobic environment utilized the fuel with attendant generation of current.

EXAMPLE V

As a further example of the action of a facultative anaerobe a fuel-cell was charged with *Escherichia coli* and glucose was added as the oxygen containing fuel. A reduction-oxidation potential was effected and a current resulted. Prior to adding the *E. coli* the EMF was 148 mv. and the voltage at a Helipot resistance of 1000 ohms was 42. Upon the addition of the *E. coli* a very active suspension was obtained with the redox potential changing rapidly, the said values becoming 625 and 521, respectively, corresponding to about 0.5 milliampere.

The system contained 1% glucose and 1% sodium chloride in 0.05 molar phosphate buffer at a pH of 7.

The addition of a hydrogen acceptor, such as methylene blue, had no effect for this bacterium has its own "built-in" hydrogen acceptors and was physiologically very active. In certain other experiments cells of facultative anaerobes were used which were not at their top activity because of their age, or method of cultivation or the adverse effects of growth media or some such reason. When an electron exchanger, such as methylene blue, was added in those instances, the reactions were accelerated; dehydrogenation rates increased with attendant improvement in the current maintenance and amount.

In a number of other experiments a variety of fuels containing carbon, hydrogen and oxygen, being used instead of glucose, leads to the conclusion that any such fuel can be used. A listing includes phenylacetic acid, benzoic acid, cyclohexylacetic acid and many other products obtained by microbial action on hydrocarbons.

EXAMPLE VI

The experiment of Example I was repeated using gluclose, Nocardia grown on n-butane, and methylene blue, the EMF resulting being 340 mv. and the current being 0.2 milliamperes. Potassium ferricyanide (1 mg.) was then added to the cathodic cell. A strong increase in current resulted, the EMF going to 580 and the current to 2.5 milliamperes. Stepwise addition of the iron salt (4 additional 1 mg. portions) led to an EMF of 600 mv. with 4.5 milliamperes of current.

In a further experiment using *E. coli* it was determined that greater current is produced when the potassium ferricyanide is present in both cells than when the iron salt is present only in the cathode. Its presence only in the biological half-cell does not lead to current.

EXAMPLE VII

Using glucose (1% solution) in 0.05 molar phosphate buffer at pH of 7.0 the EMF was 200 mv., a measurement of 10 mv. at 1000 ohms resistance being measured. The addition of methylene blue caused no change. However, upon the addition of 300 mg. of glucose oxidase forming a medium containing 1% of the enzyme, the EMF rose to 385 mv. with a measurement of 115 mv. at 10,000 ohms resistance.

In the absence of methylene blue—that is, with the system involving only glucose and the enzyme, the result was only 10 mv. at 10,000 ohms resistance. The enzyme is inactive in the absence of the hydrogen acceptor.

Similar results attain when lactic acid dehydrogenase acts upon lactic acid to produce pyruvic acid in the presence of methyl viologen. Excellent results are also obtained when succinic acid dehydrogenase acts upon succinic acid.

EXAMPLE VIII

To each of the compartments 4, 5 and 6 shown in FIGURE 1 was added an aqueous solution containing 1% glucose and 1% sodium chloride being at a pH of 7 using 0.05 molar phosphate buffer. The EMF was 141; 38 mv. was observed at a Helipot resistance of 1000 ohms. Upon the addition of glucose oxidase the values were 198 and 50, respectively, the increment being aggregative.

However, upon the addition of 5 ml. of methylene blue as 1 to 20,000 dilute solution the values became 287 and 90, respectively as a result of a reaction between glucose oxidase and glucose which released electrical energy.

When ethanol is oxidized to acetaldehyde by alcohol dehydrogenase in the presence of methylene blue in the anaerobic half-cell, similar increased current results.

In the above examples a negative electrode potential (open circuit voltage) of 200 mv. and a current as high as 0.5 milliampere is observed. When certain salts, potassium ferricyanide, for example, are added at both electrodes currents up to 4.5 milliamperes (at 600 mv.) are observed. Transistorized devices are activated to advantage. Hydroquinone, benzoquinone, which may also function as electron mediators, and other readily reversible redox reagents may be used instead of the ferricyanide salt. In the absence of the oxidator, such as microbes, the maximum voltage was only 0.2 and the current only 0.1 milliampere even with greater amounts of ferricyanide salt.

As noted above, the objects of this invention are accomplished by using enzymes such as glucose oxidase. While there have been mentioned in addition to that enzyme lactic acid dehydrogenase and alcohol dehydrogenase, it is to be appreciated that any enzyme that is oxidative may be used. Other examples of oxidative enzymes that may be used in accomplishing the objectives of this invention include peroxidase and succinic acid dehydrogenase. Further, mixtures of enzymes may be used. Thus, dehydrolyzing enzymes may be used to produce a substance that is oxidized by the oxidase. For example, sucrose can be used to hydrolyze sucrose to glucose and fructose and with glucose oxidase present, current is produced under the conditions of this invention, the glucose being oxidized to gluconic acid as before. Of the various enzymes that can be used glucose oxidase and succinic acid dehydrogenase are preferred.

From the above it will be noted that a large variety of microorganisms can be used in the processes of this invention. These include *Nocardia corallina*, strain M.O., *Nocardia paraffinae*, *Nocardia opaca*, *Pseudomonas nitrimethanica*, *Pseudomonas nitrimethanica* var. *citreus*, *Pseudomonas putida*, *Pseudomonas oleovorans*, *Pseudomonas aeruginosa*, *Pseudomonas fluoroscens*, *Mycobacterium phlei*, *Mycobacterium lacticola*, *Mycobacterium paraffinicum*, smooth strain, *Mycobacterium paraffinicum*, *Aerobacter aerogenes*, *Bacillus subtilis*, *Saccharomyces cerevisiae* (yeast), *Rhizopus*, *Penicillium*, and *Aspergillus* (fungi), *Streptomyces griseus* (actinomycete), among others. In this invention, a hydrogen acceptor is required. These are materials like methylene blue and methyl viologen, and they are added to the half-cells except when the oxidator is or has within itself the said exchanger. It will be appreciated, however, that in the growing state these various microorganisms are usually kept in media that have pH values of about 6.0 to about 8.0, the pH being preferably 7.0. Buffers, such as phosphates like potassium dihydrogen phosphate, can be added to the oxidators to maintain the desired pH.

The media will contain a mineral salt mixture which will include salts like the carbonates, chlorides, sulfates, phosphates, molybdates and the cations are such materials as potassium, sodium, manganese, iron and the like. Generally, the oxidizer is run at atmospheric pressure at a temperature of about 75° F. to about 115° F.

The hydrocarbon that is used may be a single hydrocarbon or a mixture and it may be gaseous, liquid or solid. Generally, the hydrocarbon is fed admixed with air, the mixture containing from about 15% to about 50% of gaseous hydrocarbon or about 1% to about 3% of liquid or solid hydrocarbon. Hydrocarbons that are used include methane, ethane, propane, n-butane, toluene, xylene, mesitylene, ethylbenzene, diethylbenzene, propylbenzene, butylbenzene, amylbenzene, hexylbenzene, heptylbenzene, octylbenzene, p-cymene, methylnaphthalene, ethylnaphthalene, methylcyclopentane, dimethylcyclopentane, trimethylcyclopentane, ethylcyclopentane, diethylcyclopentane, propylcyclopentane, butylcyclopentane, amylcyclopentane, hexylcyclopentane, heptylcyclopentane, amylcyclopentane, octylcyclopentane, methylcyclohexane, dimethylcyclohexane, trimethylcyclohexane, tetramethylcyclohexane, ethylcyclohexane, propylcyclohexane, isopropyl-4-methylcyclohexane, butylcyclohexane, amylcyclohexane, hexylcyclohexane, heptylcyclohexane, and octylcyclohexane. Also, normal hydrocarbons can be used such as n-hexadecane, n-tetradecane, n-octadecane, n-eisocosane, and n-dodecane. Oily materials such as mineral oils, paraffins, crude oil, partially refined oil and the like may be used.

While it is preferred to obtain the extracellular, oxygen-containing compounds that are fed to the microorganism in the anaerobic half-cell from hydrocarbons because of their low cost, it is to be appreciated that any oxygen-containing compound may be fed to the said living organism, providing, of course, the said organism can metabolize the material. Thus, the chemicals used may be obtained from natural sources including the natural proteins, fats, carbohydrates occurring in the animal or vegetable kingdoms or made from them. These materials include, for example, the albumins, globulins, prolamins, the amino acids, the stearic, palmitic or oleic esters, the polysaccharides, starches, molasses, or soribotol. Also, lactic acid, succinic acid, butyric acid, ethanol, lactose, sucrose, acetic acid and many other organic acids, sugars and alcohols may be used. These materials may be used in the fuel cells as described above with the production of electric current.

Of the various microorganisms that do not require added electron mediators, E. coli is preferred, while of those converting hydrocarbon to usable fuel, the Nocardia are preferred. The latter is true because Nocardia are fast multipliers. For example, they multiply at a very rapid rate compared to Mycobacteria. The generation time of the Nocardia is about 30 minutes as compared to something like 24 hours for the Mycobacteria. Further, Nocardia grow very well on hydrocarbons and they are not limited in the kind and number of hydrocarbons that they can utilize as are some of the other organisms that are hydrocarbon oxidizers but only in a selective fashion. Still further, the preferred fuels of this invention are extracellular materials. They are not used at the expense of cellular strength or life. Rather, they are a food contributing not only to cellular life but to the production of electric current. They are cheap naturally occurring materials or readily derived from cheap hydrocarbons by the action of living material to be used on the spot in the current producing step. The microorganisms act independently of their stored energy which in turn is obtained from inexpensive materials. The conversion of inexpensive hydrocarbons to electrical energy by the microbial processes of this invention affords an attractive route to electrical power production.

It should be noted that in the processes of this invention which involve the use of enzymes catalytic reactions are involved in the enzymatic conversions. The electron mediator which is present increases the hydroxyl ion driving force gradient. Ideally, the mediator should give up electrons to the electrode very rapidly and release hydrogen ions simultaneously. However, as a matter of practicality the hydrogen acceptors that are used are not catalytic to that extent and the reactions that are involved are fairly slow reactions as compared to catalytic reactions. Thus, the conversion of the reduced hydrogen acceptor to the oxidized form is generally done by the cyclic step described above, and it is accomplished by simple recycling the fluid containing the mediator and exposing it to oxygen. At the same time microbial oxidators can be refattened.

The principal reaction of the electron mediator appears to be dehydrogenation resulting in a reduced oxidation potential in the anodic half-cell. The availability of current is largely controlled by the transfer of electrons to the anode wherein, theoretically, activated hydrogen becomes hydrogen ions as the electrons are absorbed by the electrodes. The production of hydroxyl ions in the cathodic half-cell is controlled by the availability of electrons from the anodic half-cell reactions. These hydroxyl ions are brought to the hydrogen ions with the assistance of the hydrogen acceptor, the circuit being thus completed more rapidly. Thus, ideally the mediator should be catalytic in its reaction. Since the anaerobes have their hydrogen acceptors actually contained in and functioning within the cells, they are preferred in this invention, for they come most nearly to the ideal stage. Any of the many redox indicator dyes may be used in the process of this invention, and these include toluylene blue, methylene blue, methyl viologen, cresyl blue and resazurin (diazoresocinol). Further, nitrate ions can serve as the hydrogen (electron) acceptors under anaerobic conditions with certain microbes as for example with *E. coli*. Usually nitrite ion is produced or in some cases nitrogen gas is the ultimate product of the nitrate reduction. In effect, nitrate is being used here as a substitute for oxygen as the hydrogen acceptor.

Although the processes described above use living organisms, it is readily appreciated that the processes involved are chemical and electrical processes or manners of new manufacture all of which require an operator who maintains the appropriate conditions and drives the microorganisms to the desired results.

While the invention has been disclosed herein in connection with certain structural embodiments and certain procedural details, it is clear that changes, modifications or equivalents can be used by those skilled in the art; accordingly, such changes within the principles of this invention are intended to be included within the scope of the claims below.

We claim:

1. A process for obtaining electrical power from biological-biochemical processes which process comprises forming a fuel cell containing an anaerobic half-cell and an aerobic half-cell each of which contains an electrolyte and an electrode; anaerobically effecting, at a pH of about 6.0 to about 8.0, the oxidation of a fuel containing carbon, hydrogen and oxygen by an oxidator in the presence of a hydrogen acceptor selected from the group consisting of methylene blue, methyl viologen, toluylene blue, cresyl blue and resazurin, an anode and said electrolyte in said anaerobic half-cell; allowing electrons from the said conversion to be released to the said anode in the said anaerobic half-cell and hence to an external circuit; reducing oxygen in the cathodic half-cell of said fuel cell at a cathode contained in said half-cell and connected to said external circuit; and allowing the resultant oxide ions to flow through said electrolytes to said anode to complete the circuit.

2. A process for obtaining electrical power from biological-biochemical processes which process comprises forming a fuel cell containing an anaerobic half-cell and an aerobic half-cell each of which contains an electrolyte and an electrode; anaerobically effecting, at a pH of about 6.0 to about 8.0, the oxidation of a fuel containing carbon, hydrogen and oxygen by an oxidator in the presence of a hydrogen acceptor which is a redox indicator dye, an anode and said electrolyte in said anaerobic half-cell; allowing electrons from the said conversion to be released to the said anode in the said anaerobic half-cell and hence to an external circuit; reducing oxygen in the cathodic half-cell of said fuel cell at a cathode contained in said half-cell and connected to said external circuit; and allowing the resultant oxide ions to flow through said electrolytes to said anode to complete the circuit.

3. A process in accordance with claim 2 in which the said oxidator is an aerobe.

4. A process in accordance with claim 2 in which the said oxidator is an anaerobe.

5. A process in accordance with claim 2 in which the said oxidator is an enzyme.

6. A process in accordance with claim 2 in which said oxidator is a microorganism.

7. A process in accordance with claim 2 in which said oxidator is a facultative anaerobe.

8. A process in accordance with claim 2 in which a readily reversible redox reagent is contained in both half-cells in addition to said acceptor.

9. A process for obtaining electrical power from biological-biochemical processes which process comprises forming a fuel cell which contains an anaerobic half-cell having therein an anode, an electrolyte and an electrical connection to an external load device and which contains an aerobic half-cell having therein a cathode, an electrolyte and an electrical connection to said device; in said anaerobic half-cell anaerobically effecting, at a pH of about 6.0 to about 8.0, the oxidation of a fuel by an oxidizing medium comprising an oxidator and a hydrogen acceptor selected from the group consisting of methylene blue, methyl viologen, toluylene blue, cresyl blue and resazurin, allowing electrons from said conversion to be released to said anode and hence to said device; reducing oxygen in the cathodic half-cell; allowing resultant oxide ions to flow through said electrolyte to said anode to complete the circuit; and circulating said oxidizing medium to a rejuvenation chamber in which it is exposed to oxygen prior to its return to said anaerobic half-cell.

10. A process for obtaining electrical power from biological-biochemical processes which process comprises forming a fuel cell which contains an anaerobic half-cell having therein an anode, an electrolyte and an electrical connection to said device; in said anaerobic half-cell anaerobically effecting, at a pH of about 6.0 to about 8.0, the oxidation of a fuel by an oxidizing medium comprising an oxidator and a hydrogen acceptor which is a redox indicator dye, allowing electrons from said conversion to be released to said anode and hence to said device; reducing oxygen in the cathodic half-cell; allowing resultant oxide ions to flow through said electrolyte to said anode to complete the circuit; and circulating said oxidizing medium to a rejuvenation chamber in which it is exposed to oxygen prior to its return to said anaerobic half-cell.

11. A process in accordance with claim 10 in which said oxidator is an aerobe.

12. A process in accordance with claim 10 in which said oxidator is an anaerobe.

13. A process in accordance with claim 10 in which said oxidator is an enzyme.

14. A process in accordance with claim 10 in which both cells contain a readily reversible redox reagent in addition to said acceptor.

15. A process for obtaining electrical power from biological-biochemical processes which process comprises forming a biological fuel cell comprising an anaerobic half-cell, an aerobic half-cell and an external circuit connecting the two half-cells and containing in the said anaerobic half-cell a fuel comprising a chemical having in it carbon, hydrogen and oxygen and containing in the said anaerobic and in the said aerobic half-cell an aqueous solution of an electrolyte; adding to the said anaerobic half-cell a hydrogen acceptor selected from the group consisting of methylene blue, methyl viologen, toluylene blue, cresyl blue and resazurin; and anaerobically effecting, at a pH of about 6.0 to about 8.0, the oxidation of the said fuel in the said anaerobic half-cell by an oxidator in the presence of said acceptor, thereby releasing electrons to the external circuit of said fuel-cell for passage thereof to the aerobic cell effecting thereby reduction of oxygen in the said aerobic cell with resultant release of oxide ions to complete the circuit and to produce said power.

16. A process in accordance with claim 15 in which gaseous oxygen is fed into the said aerobic cell while the said anaerobic oxidation is occurring in the said anaerobic half-cell.

17. A process for obtaining electrical power from biological-biochemical processes which process comprises forming a fuel cell containing an anaerobic half-cell and an aerobic half-cell each of which contains an electrolyte and an electrode; anaerobically effecting, at a pH of about 6.0 to about 8.0, the oxidation of a fuel containing carbon, hydrogen and oxygen by *E. coli* which functions as an oxidator and as a hydrogen acceptor in the presence of an anode and said electrolyte in said anaerobic half-cell; allowing electrons from the said conversion to be released to the said anode in the said anaerobic half-cell and hence to an external circuit; reducing oxygen in the cathodic half-cell of said fuel cell at a cathode contained in said half-cell and connected to said external circuit; and allowing the resultant oxide ions to flow through said electrolytes to said anode to complete the circuit.

References Cited
FOREIGN PATENTS 249,016   3/1926   Great Britain.

OTHER REFERENCES

Business Week, May 6, 1961, page 68.

Proc. Royal Soc., London (B Series), Biological Papers, vol. 84, March 1912, pp. 260–276.

Science and Mechanics, August 1961, pp. 116, 117.

WINSTON A. DOUGLAS, *Primary Examiner.*

JOHN H. MACK, *Examiner.*

H. FEELEY, A. B. CURTIS, *Assistant Examiners.*